(12) United States Patent
Bernardi et al.

(10) Patent No.: US 7,224,849 B2
(45) Date of Patent: May 29, 2007

(54) METHOD FOR DETERMINING AN OPTIMUM GAIN RESPONSE IN A SPATIAL FREQUENCY RESPONSE CORRECTION FOR A PROJECTION SYSTEM

(75) Inventors: Bryan D. Bernardi, Webster, NY (US); William M. Barnick, Fairport, NY (US); Dale L. Tucker, Byron, NY (US); Damian M. Muniz, Churchville, NY (US)

(73) Assignee: Eastman Kodak Company, Rochester, NY (US)

( * ) Notice: Subject to any disclaimer, the term of this patent is extended or adjusted under 35 U.S.C. 154(b) by 995 days.

(21) Appl. No.: 10/360,030

(22) Filed: Feb. 7, 2003

(65) Prior Publication Data

US 2004/0156080 A1    Aug. 12, 2004

(51) Int. Cl.
  *G06K 9/40* (2006.01)
  *H04N 1/407* (2006.01)
(52) U.S. Cl. ............... 382/275; 382/263; 382/264; 358/3.26
(58) Field of Classification Search ......... 382/260, 382/274, 275, 298, 300, 312; 358/1.9, 3.26, 358/406, 504, 302
See application file for complete search history.

(56) References Cited

U.S. PATENT DOCUMENTS

| 5,113,258 A | * | 5/1992 | Roth | 348/619 |
| 5,652,661 A | | 7/1997 | Gallipeau et al. | |
| 5,701,185 A | | 12/1997 | Reiss et al. | |
| 5,745,156 A | | 4/1998 | Federico et al. | |
| 6,618,185 B2 | * | 9/2003 | Sandstrom | 359/292 |
| 6,795,572 B1 | * | 9/2004 | Matsuno | 382/132 |

* cited by examiner

*Primary Examiner*—Kanjibhai Patel
(74) *Attorney, Agent, or Firm*—Nelson Adrian Blish

(57) ABSTRACT

A method for determining an optimum gain response in a spatial frequency correction for a projection system comprises the steps of setting a code value (100) to a first code value; projecting a flat field image at the code value; capturing the flat field image (540) with a camera; creating a defect map (70) of defects in the flat field image; applying the defect map to the flat field image to form a corrected image; setting a gain table (80) to a first gain for the corrected image; applying the gain table to the corrected image; registering the corrected image; filtering the registered image; measuring the filtered image for a standard deviation (570); determining whether all gains for producing an under corrected image (60) and an over corrected image have been exhausted for the code value; if all gains have not been exhausted for the code value, set the gain table to the first gain plus n and go to the step of applying the gain table to the corrected image, if all gains have been exhausted go to determining an optimum gain for the code value.

51 Claims, 11 Drawing Sheets

METHOD FOR DETERMINING AN OPTIMUM GAIN RESPONSE IN A SPATIAL FREQUENCY RESPONSE CORRECTION FOR A PROJECTION SYSTEM

CROSS REFERENCE TO RELATED APPLICATIONS

Reference is made to commonly-assigned U.S. patent application Ser. No. 09/606,891, filed Jun. 29, 2000, now U.S. Pat. No. 6,943,919, entitled A METHOD AND APPARATUS FOR CORRECTING DEFECTS IN A SPATIAL LIGHT MODULATOR BASED PRINTING SYSTEM, by William M. Bamick and U.S. patent application Ser. No. 09/712,641, filed Nov. 14, 2000, now abandoned, entitled METHOD OF COMBINING ACQUIRED DIGITAL DATA TO CONSTRUCT A COMPOSITE IMAGE, by Jose A. Rosario et al., the disclosures of which are incorporated herein.

FIELD OF THE INVENTION

The present invention relates in general to defect correction of digital projection devices and in particular to generating a gain table response for defect correction from scans of images corrected from a composite image defect map.

BACKGROUND OF THE INVENTION

Digital printing is often achieved using a single spatial light modulator, such as a low cost liquid crystal display (LCD) modulator, to expose photographic paper. Several photographic printers using commonly available LCD technology are described in U.S. Pat. Nos. 5,652,661; 5,701,185; and 5,745,156. Most of these designs involve the use of a transmissive LCD modulator such as is depicted in U.S. Pat. Nos. 5,652,661 and 5,701,185.

A problem with all of these devices is that they occasionally produced defects in the final image. These defects may be due to, for example, surface finishing of the LCD, which results in high spatial frequency defects. Another defect, again using the LCD as an example, is low spatial frequency defects in the resulting image caused by warping of the support plate as it is attached to the LCD during manufacture.

In copending U.S. patent application Ser. No. 09/606,891 correction for such spatial defects is described, and provides for a simple means to correct such defects using a correction defect map, along with a gain correction table. In copending U.S. patent application Ser. No. 09/712,641 a means for adequately generating the correction defect map is provided. U.S. patent application Ser. No. 09/712,641 addresses the issue of providing adequate registration and a correction map for high spatial frequency defects. However, the gain correction table used by U.S. patent application Ser. No. 09/606,891 is determined in a subjective manner using photographic prints and human judgement.

It is a purpose of this invention to provide means for creating a correction gain table in a non-subjective, timely, and manufacturable way.

SUMMARY OF THE INVENTION

Briefly, according to one aspect of the present invention a method for determining an optimum gain response in a spatial frequency correction for a projection system comprises the steps of setting a code value to a first code value; projecting a flat field image at the code value; capturing the flat field image with a camera; creating a defect map of defects in the flat field image; applying the defect map to the flat field image to form a corrected image; setting a gain table to a first gain for the corrected image; applying the gain table to the corrected image; registering the corrected image; filtering the registered image; measuring the filtered image for a standard deviation; determining whether all gains for producing an under corrected image and an over corrected image have been exhausted for the code value; if all gains have not been exhausted for the code value, set the gain table to the first gain plus n and go to the step of applying the gain table to the corrected image, if all gains have been exhausted go to determining an optimum gain for the code value.

According to one embodiment this includes a charged coupled device (CCD) camera in the focal plane of the device for scanning corrected images. A defect correction is applied at various gain levels, scanned, and evaluated for a gain which yields optimum defect correction. The process is repeated for several drive values (digital code values) throughout the range. Enough gain points are determined to generate a full gain table based on code value. Different methods for scanning and evaluation are applied to low spatial frequency, and high frequency spatial corrections. For example, for low frequency correction, a scan is done at the highest and lowest reflection points to determine optimum gain. For high frequency corrections the scans would be at one place in the image which shows the worst high frequency variations. Finally, the full gain table is multiplied by the defect map, and applied to the image resulting in an optimally corrected image.

It is an advantage of the present invention to provide a non-subjective evaluation of the gain table. The gain at each, or several code values is evaluated statistically from CCD camera data, and not from human judgement. Other means for determining gain at each code value is for subjective human inspection of a projected image, or likewise inspection of prints made from projection onto photographic paper. In the case of photographic paper, the response of the paper, and printing system is not introduced to further complicate judgement of defect correction. This method provides an automated determination of the gain table, which lends itself to a much more timely creation of the gain table.

In addition to providing better defect correction, the gain table is determined without the full use of a printing system. The printing system will often involve chemicals and tone calibration, as with a traditional photographic printing system. Thus, it is a further advantage of the present invention to allow determination in manufacturing of the correction gain table without full system integration, and use of chemical printing on the assembly line. The correction at this point is independent of paper, and chemistry, and allows for a defect corrected imaging head to be put into any printer with a chemical processor, or sent as field replacement to another processor already in the market. This is not as much of an advantage for imaging heads used in a projection system, however, it still provides for an automated manufacturing approach for digital projection.

The invention and its objects and advantages will become more apparent in the detailed description of the preferred embodiment presented below.

DETAILED DESCRIPTION OF THE INVENTION

The present invention will be directed in particular to elements forming part of, or in cooperation more directly with the apparatus in accordance with the present invention. It is to be understood that elements not specifically shown or described may take various forms well known to those skilled in the art.

Figure 1:
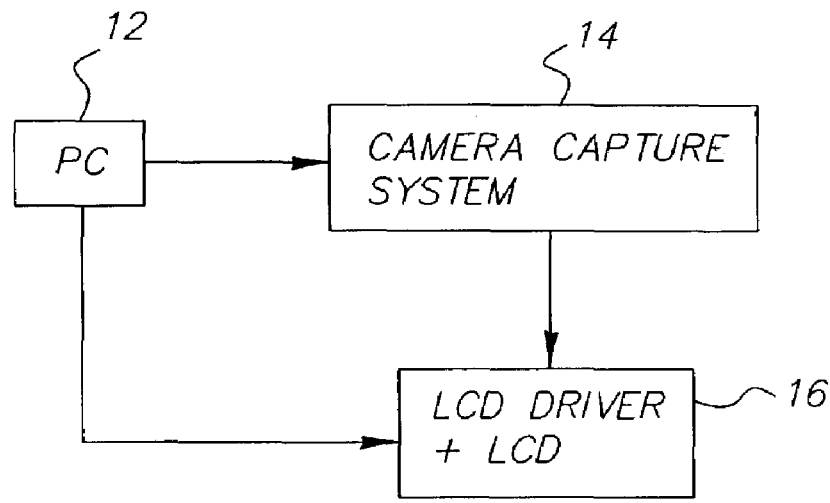
FIG. 1 is an overall system block diagram of the scan system used to measure the gain table response.

Referring now to FIG. 1 a personal computer (PC) 12 controls the camera capture system 14, and retrieves images from the camera capture system 14, along with controlling the liquid crystal device (LCD) through it's driver 16. The camera capture system block and LCD driver plus LCD are also shown in FIG. 1. The PC is also used for image processing and determination of the gain table response of the present invention.

Figure 2:
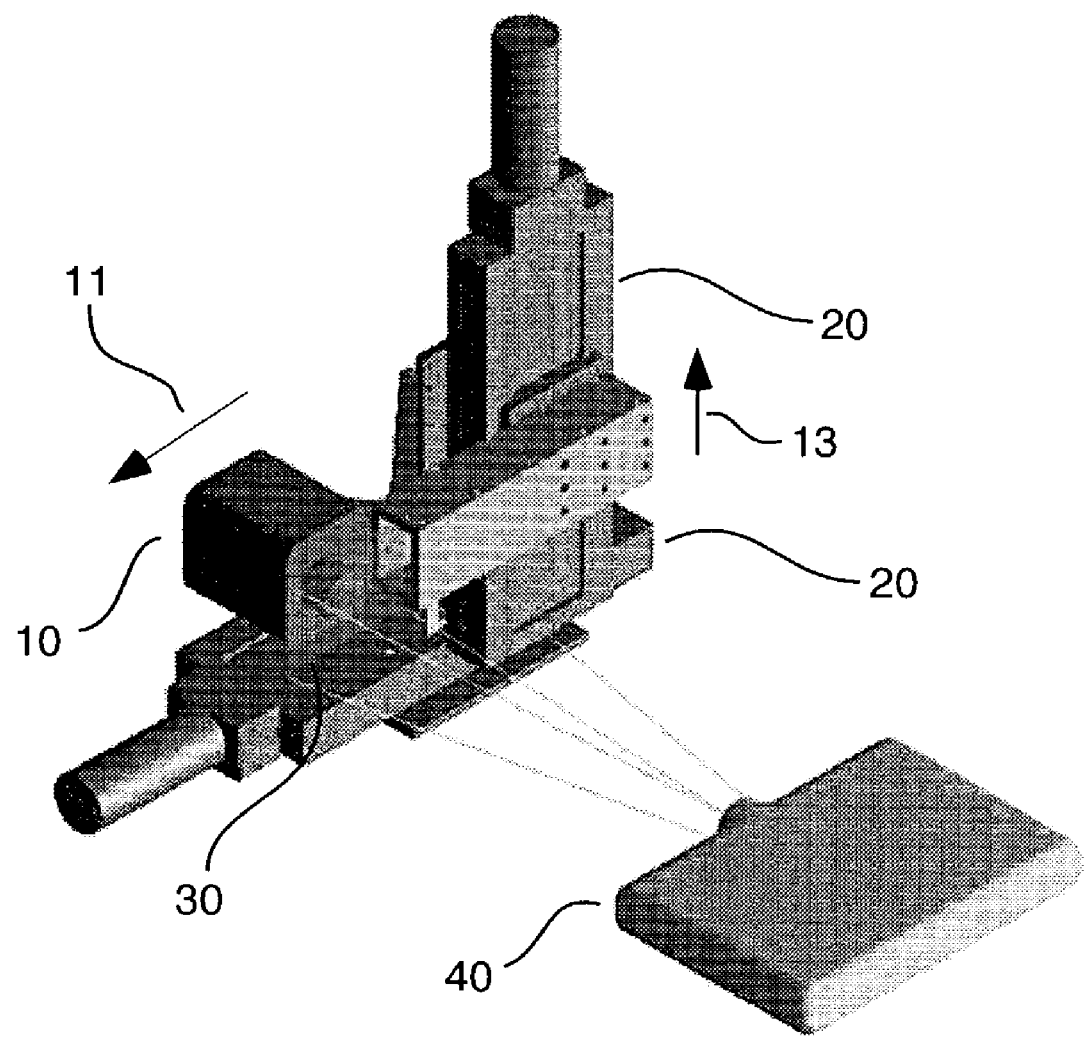
FIG. 2 is an assembly diagram of the scan system and LCD projection system.

Referring next to FIG. 2 an assembly drawing shows the camera capture system 14 assembly including a camera 10, translation stages 20, for moving the camera in an x, y plane with respect to the image plane 30 created by LCD driver and projection system 40. Arrow 11 shows movement of camera 10 in a horizontal direction and arrow 13 shows movement of camera 10 in a vertical direction. In the event that the projection system 40 projects an image larger than camera 10, then translation by stages 20 allows capture of projected image and various points in the projected image plane 30.

Figure 3:
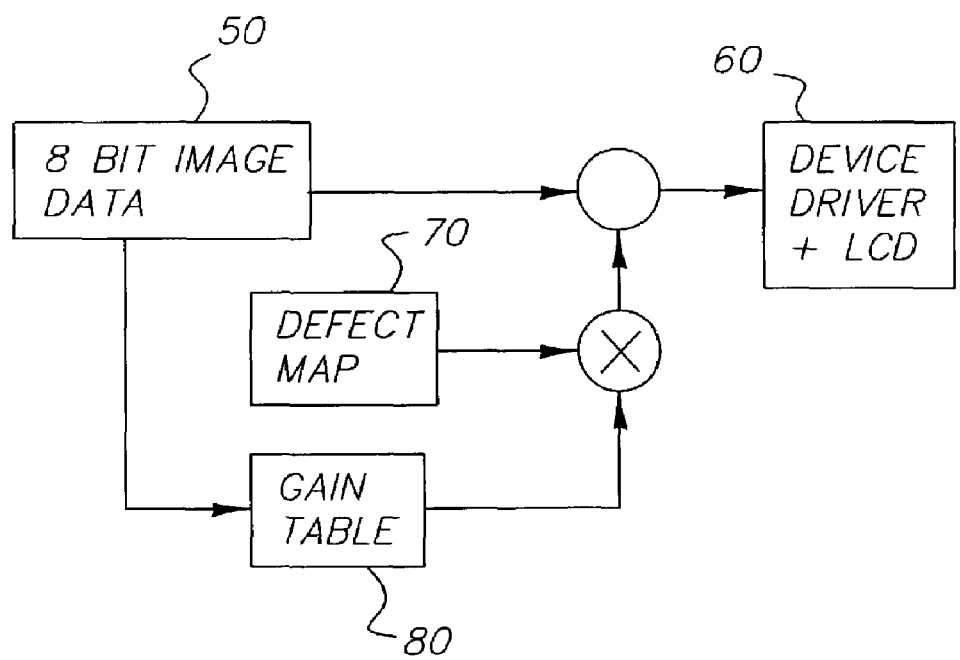
FIG. 3 is a flowchart of a typical defect correction render path.

FIG. 3 is a flowchart of a typical defect correction algorithm using a defect map and gain table to provide a defect offset that is a function of spatial coordinates. The defect is added to the incoming image data 50 to create a corrected image 60, which is sent to the device driver. Optimum defect correction is created by a defect map 70, which is a map of defects versus spatial locations at one code value. The gain table 80 is a function of code value thus allowing attenuation, or gain of the defect map for optimum operation at other code values. Determining the optimum gain table is achieved in the present invention by applying varying gains to the gain table 80 shown in FIG. 3, and analyzing the results scanned by the camera 10 of FIG. 2, produced by the corrected image 60 of FIG. 3 when the varying gains are applied.

Figure 4:
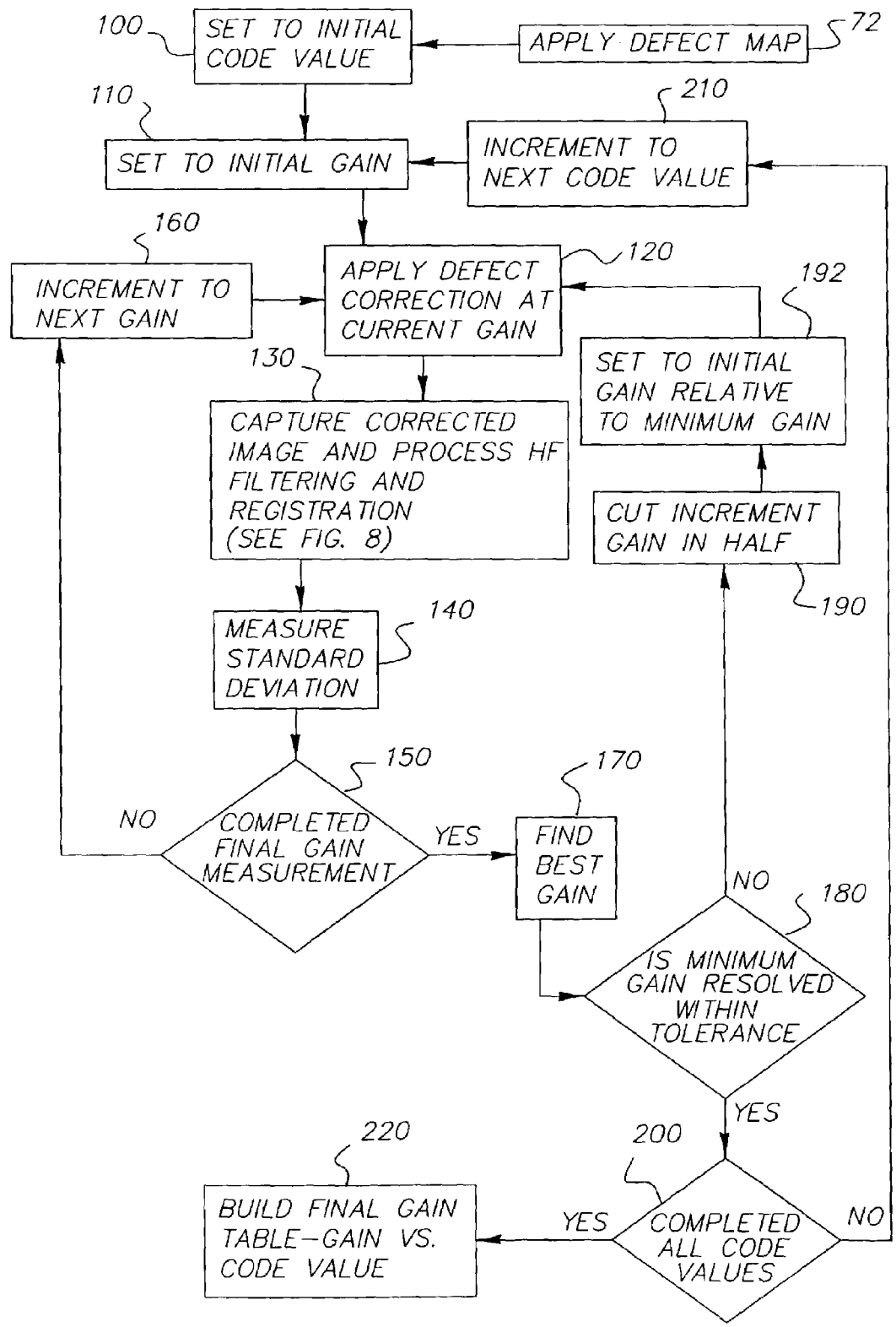
FIG. 4 is a flowchart of an automated gain table generation for high spatial frequency defects using a successive approximation algorithm.

Referring now to FIGS. 3 and 4, which shows a flowchart using a successive approximation approach to determine the gain table for a high spatial frequency defect. Firstly, the defect map 70 is applied at step 72, as shown in diagram of FIG. 4. The uncorrected image data 50 of FIG. 3 is set to an initial code value, as shown by block 100 of FIG. 4. This image data is set to one code value, step 100, at every spatial location across the device, from now on referred to as a flat field. The initial flat field is set to a code value at one end of the code range, for example a code value of 0 out of a range from 0 to 255.

Following the flowchart of FIG. 4, to block 110, the gain table 80 is set to an initial gain for the initial code value. This initial gain is a gain multiplier at one end of the range of gain tables. This is likely to be a gain equal to 0, i.e. no defect correction. Continuing on through the flowchart, the defect correction is applied in block 120, the image is processed in block 130, and measured for a standard deviation metric in block 140. (Capture and image processing of block 130 will be explained later, and is shown in detail in FIG. 8.) A standard deviation metric is used in 140 is due to the nature of the high spatial frequency defect. High frequency defects are often very small in spatial separation and occur at random spatial intervals. It is difficult to use a method which picks out an individual defect and compare it to another, as is able to be used in the low spatial frequency defect evaluation described as another part of this invention. The standard deviation for the current gain value is recorded.

Flowchart decision block 150 in FIG. 4 determines whether all gains have been exhausted for the current code value. The range of gains which guarantees optimum correction is known in this embodiment. That is to say that a maximum gain is known which is more gain than is needed to achieve optimum correction. If the maximum gain is not known it should be understood by someone skilled in the art that gains are increased until the image has been over corrected. If all gains have not been exhausted then an increment is applied to the gain, as shown in block 160. Repeatedly defect correction is applied and a standard deviation is recorded for every gain value. Once the effect of all gains for the initial code value have been recorded, decision from block 150 will move on to block 170.

In block 170 of FIG. 4 a minimum standard deviation is found, and the gain which led to this minimum standard deviation is recorded as the best gain. In decision block 180 the standard deviation of the gain values just one measurement above and below the minimum gain are evaluated. If the standard deviation of the minimum gain is not found to be within tolerance of the two adjacent gains, then the flowchart continues on to block 190. The tolerance needs to be determined prior to implementation of the algorithm. For example, lets say the camera 10 is a 10-bit camera. Furthermore, it is known that the best correction achieved for this defect is a standard deviation of four out of the 1024 codes, but also good enough correction is achieved when the standard deviation is as high as 4.5. The tolerance would be 0.5 within the minimum.

At this point the minimum gain has not been found within tolerance so the successive approximation is to close in upon the optimum gain. Block 190 in FIG. 4 describes cutting the gain increment in half, and setting the starting gain 192 to values above and below the current minimum gain. Just as the gain increment is cut in half, the range of gains will be cut in half For example, say initially gains were measured from 0% to 200%, at an increment of 25%. Furthermore, the minimum gain is found at 75%. The next increment will be half as much or 12.5%, while the range will be 100% versus 200%. In addition the range will be centered on the current minimum of 75%, and the new parameters will be to step from 25 to 125% in steps of 12.5.

This procedure will continue to loop through the flowchart until a minimum gain has been found within tolerance at block 180. Next to block 200 of FIG. 4, a decision is made as to whether all code values have been exhausted. If not then the next code value sets the flat field of the device to the next level, block 210 of FIG. 4. The most complete implementation of this would be to have every code value exhausted. For example, in a device with 8-bit inputs then all 256 codes can be measured. As a preferred embodiment of this invention all possible code values should be measured, however, a subset can be measured and final gain table can be achieved via a curve fit of gains versus code value. Finally, block 220 of FIG. 4 is the final output of the full table of gains for every code value.

Figure 5:
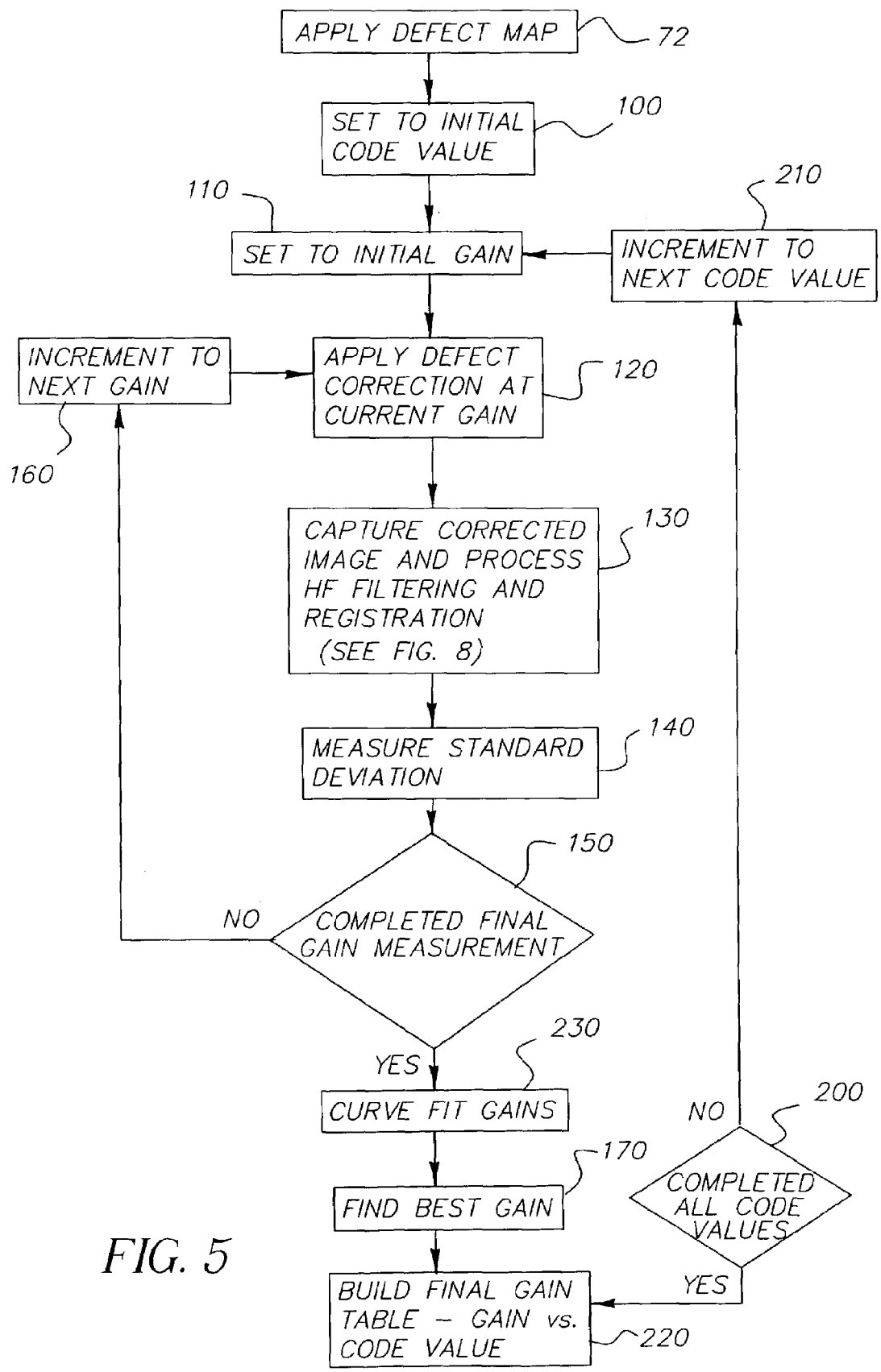
FIG. 5 is a flowchart of an automated gain table generation for high spatial frequency defects using a curve fitting algorithm.

Referring now to FIG. 5, a flowchart showing a method for determining the gain table for high frequency defects using a simple curve fit approach. As in the description of FIG. 4, the application of various gains follows through the flow chart to block 150 in FIG. 5 until all gains are measured. For the present embodiment of this invention the range of gains to guarantee achieving optimum correction is known, as explained previously. After all gains have been exhausted for the current code value, block 150 passes through to block 230 in FIG. 5. At block 230 in FIG. 5 the standard deviations versus gain is curve fit with a polynomial or other appropriate curve fit. The nature of the curve fit needs to be known based on the particular system and defect, to be determined prior to implementation of this algorithm. Once curve fitting is applied, a minimum standard deviation is found, and the gain which produced it is recorded as the minimum gain. Again in block 200 of FIG. 5 all code values are expired, and in block 220 a final gain table is built just as in FIG. 4. The advantage to the curve fit method is speed in converging on a gain table. However, the disadvantage is that it does not necessarily determine the optimum gain as precisely.

Figure 8:
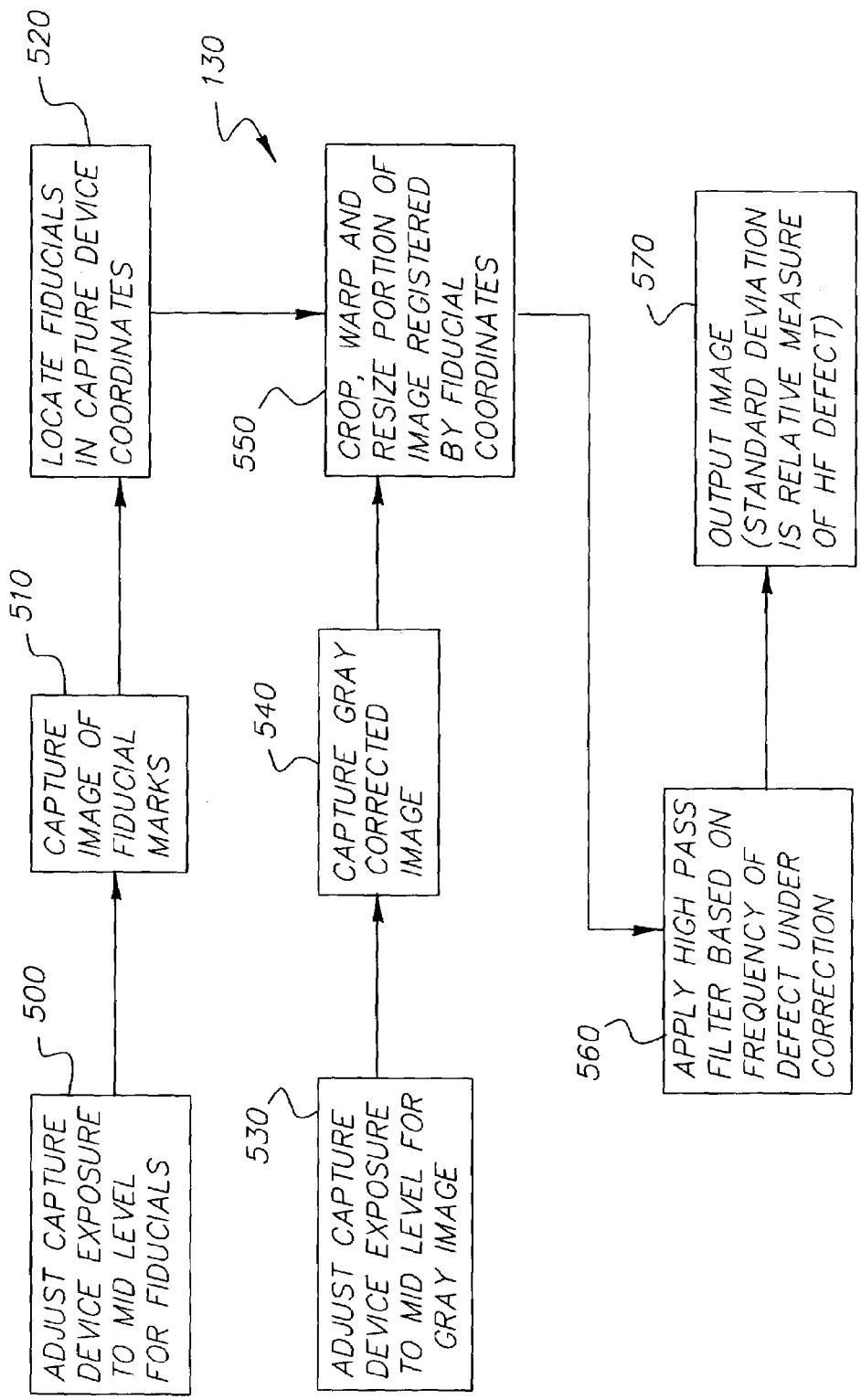
FIG. 8 is a flowchart of projected image capture and image processing for high spatial frequency defects.

Referring ahead to FIG. 8, a flowchart showing the capture and processing of the high spatial frequency corrected image to produce a standard deviation metric. The image processing in FIG. 8 is like the processing described in copending U.S. patent application Ser. No. 09/712,641 for creation of the defect map. Block 500 of FIG. 8 describes imaging a set of fiducials, and setting the exposure parameters of the camera 10 of FIG. 2 to capture the fiducials in the camera mid range. The fiducials are captured by the camera in block 510, and the coordinates of the fiducials are found in block 520. These fiducial coordinates give accurate registration of LCD pixels in terms of camera pixel coordinates.

In block 530 of FIG. 8 the camera exposure level is set for the current code value, of which the gain is being obtained, to mid range of the camera. For example the flat field code value is set to 100, but the camera range is 10-bit, 0 to 1023. The camera's exposure settings, set by things such as shutter speed, is set such that the device flat field of 100 translates to a mean of approximately 512 or mid-range of the camera's code space. Setting the camera exposure is achieved by taking pictures with the camera, measuring the mean value of the captured image, and adjusting camera exposure parameters until the mean is 512. Moving on to block 540 the flat field corrected image from FIG. 4, and FIG. 5 block 120, is captured. Following capture, block 550 indicates, crop, warp, and resize of image based upon fiducial co-ordinates. Block 560 shows high pass filtering of image to isolate just the high frequency defect. Just as described in copending U.S. patent application Ser. No. 09/712,641. This operation is like creating another defect map, or portion of a defect map from a post corrected image to evaluate the effectiveness of the current gain. Finally, block 570 of FIG. 8 measures standard deviation of the processed image as a measure of the amplitude of the high frequency defect. This number is recorded and used in FIG. 4 and FIG. 5, block 140.

Figure 9:
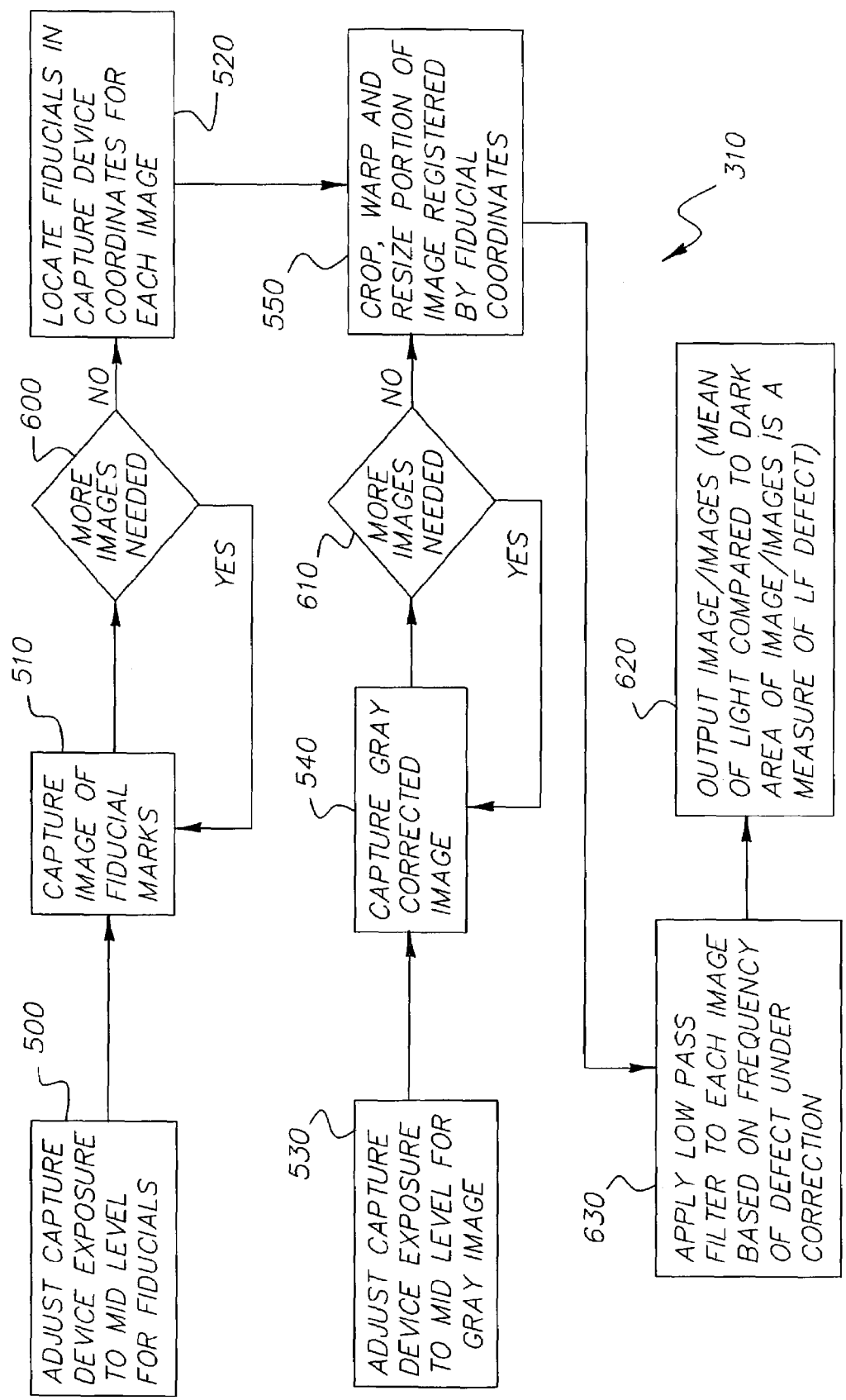
FIG. 9 is a flowchart of projected image capture and image processing for low spatial frequency defects.
Figure 10:
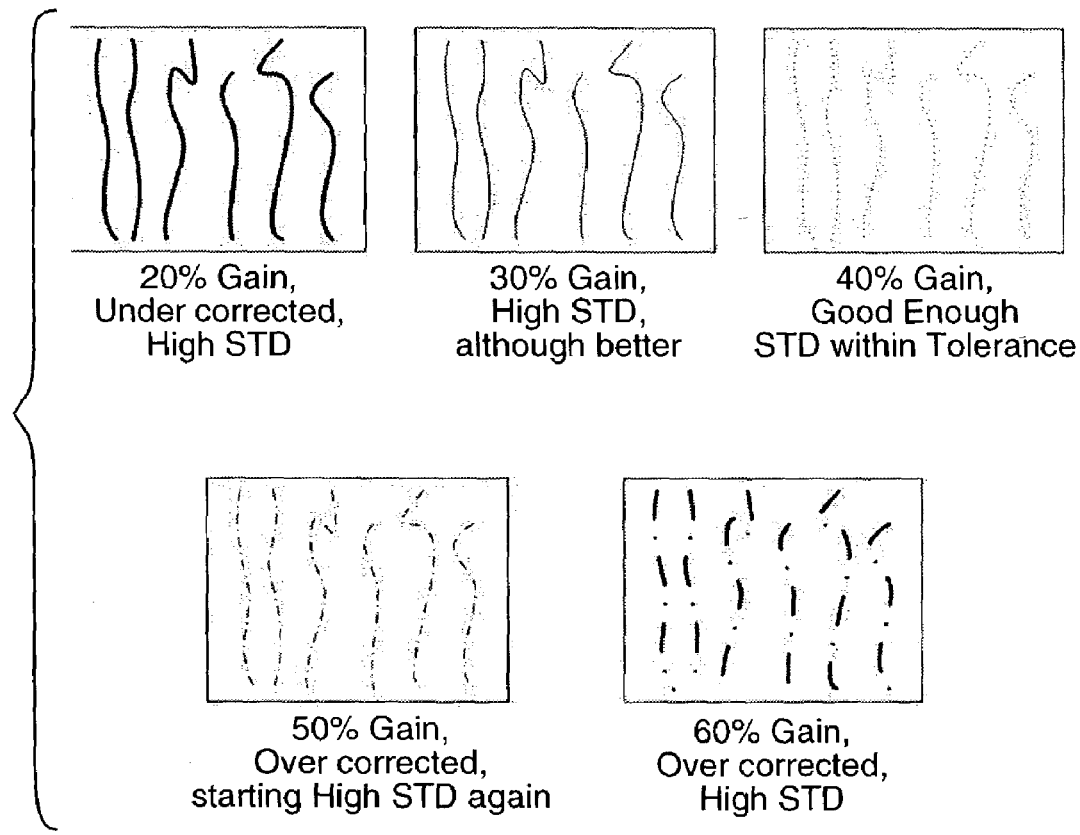
FIG. 10 shows a depiction of high spatial frequency correction images with various gain levels applied at one code value.

Referring next to FIG. 10 which is a set of example images after block 560 of FIG. 8. A series of images from 20% correction to 60% correction shows a defect ranging from undercorrected to perfectly corrected to over corrected images. In FIG. 12 is an example plot of the standard deviations of the images from FIG. 10. In FIG. 12 a minimum standard deviation point shows the best gain for producing this minimum standard deviation. In the approach described in FIG. 4, many of these plots are successively repeated until the optimum gain is converged on. Whereas in FIG. 5 only one of these plots is necessary, and a single curve fit is used to obtain a minimum gain, the curve fit shown in FIG. 12 is that of a second order polynomial. Other curve fits such cubic spline and higher order polynomial curve fits can be used. This completes explanation of the determination of a gain table for high spatial frequency defects, from FIG. 4, and FIG. 5, to FIG. 8, FIG. 10, and FIG. 12. The following FIGS. 6, 7, 9, 11, and 13 will detail the low spatial frequency case.

Figure 6:
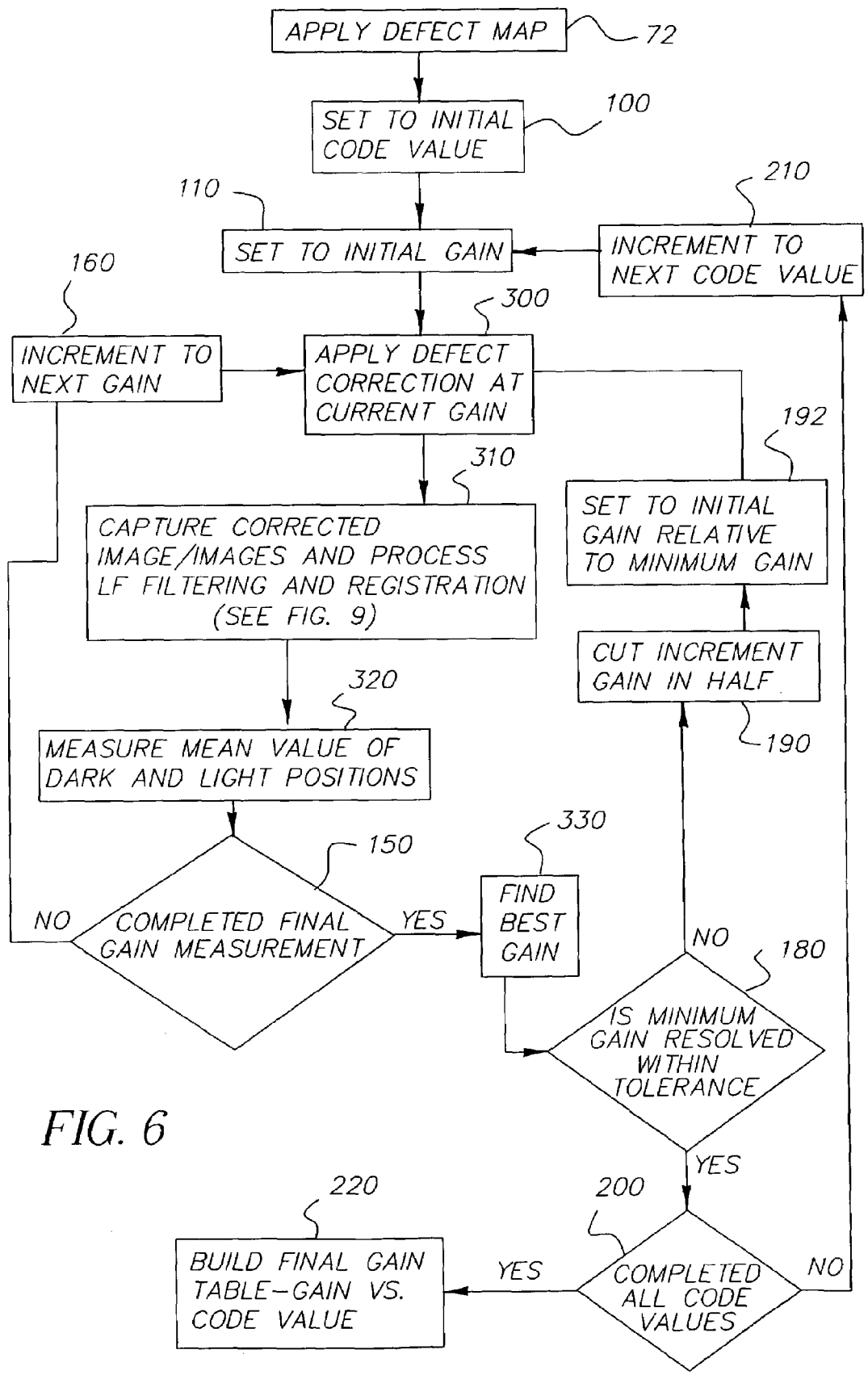
FIG. 6 is a flowchart of an automated gain table generation for low spatial frequency defects using a successive approximation algorithm.

The remaining details of this invention are pertaining to correction of low spatial frequency defects. Referring now to FIG. 6 is a flowchart detailing a method using a successive approximation approach for implementing low frequency correction, similar to the aforementioned approach described in the description of FIG. 4. Block 100 and 110 of FIG. 6 refer to the same operation as FIG. 4, an initial code value and starting gain is implemented. Following the chart to block 300 of FIG. 6, the defect correction is applied for the current code, and gain similar to block 120 of FIG. 4, with the major difference being the map contains low spatial frequency defects.

Block 310 of FIG. 6 indicates capturing the corrected image effect, as in FIG. 4 block 130. However, the significant difference lies in the nature of the defect correction. A low spatial frequency is one which needs to be evaluated over longer spatial co-ordinates on the image plane 30 of FIG. 3. In high frequency correction it is almost certain that the evaluation of block 130 can be obtained with one part of the image. This is because for this method of defect correction only one map of spatial defect is used. Thus, high frequency correction in one portion of the image must work equally to high frequency correction in another portion of the image. If the camera 10 of FIG. 2 providing the corrected image capture is too small to capture the entire device at once, the ability to move the camera with translation stages 20 of FIG. 2 are utilized. Again, for high frequency these stages will never have to move the camera but too one place such as the center of the projected image. However, in low frequency correction the capture of block 310 FIG. 6 may include capture, processing, and evaluation of many images to evaluate over a larger area of the projected image.

Following to block 320 of FIG. 6, similar to block 140 of FIG. 4, a measurement of the effect of the defect correction gain is evaluated. In the preferred embodiment for the present invention, this metric is a measure of mean value of the darkest portion of the corrected image related to mean value of the lightest portion of the image. In the high frequency correction the defects are too small and random in placement to evaluate with a simple mean difference as this, so a statistical standard deviation is used. However, it should be understood by someone skilled in the art that various applications of evaluating these defects can be interchanged, and slightly changed to other mathematical calculations. In certain cases the need to use a different mathematical metric may be necessary to improve defect correction.

Referring next to block 150 of FIG. 6, the same decision is made as block 150 of FIG. 4, all gains for the current code value must be exhausted. Refer back to the description of block 150 of FIG. 4 for detail concerning how the range of gains is determined. The resulting measurement of correction at each gain point is recorded. Block 330 of FIG. 6, similar to block 170 of FIG. 4, refers to finding the gain at which the best defect correction occurs. The difference between block 330 of FIG. 6 and block 170 of FIG. 4 is that the best gain is found as the point at which the mean difference from block 320 of FIG. 6 is closest to 0. In decision block 180 minimum difference is evaluated for whether or not it is within tolerance. Just as the tolerance of block 180 FIG. 4 was evaluated. Just as in block 190 of FIG. 4, block 190 of FIG. 6 refers to the successive approximation of a new set of gain values centered around the best gain found in block 330. Also the same as FIG. 4, block 200, 210, and 220 implement finding the gain for other code values and creation of the final gain table for low frequency defect correction Referring now to FIG. 7, the curve fitting method for low frequency gain table determination, blocks 100, 110, and 300 set the initial code, gain, and apply defect correction just as in described in FIG. 6. Block 310 and 320 show capture of the resulting image from defect correction, and measuring the effect of this correction in mean dark minus light image positions, just as in FIG. 6. Again at block 150 all gain values are exhausted and the defect correction measurement is stored for all gain values.

Figure 7:
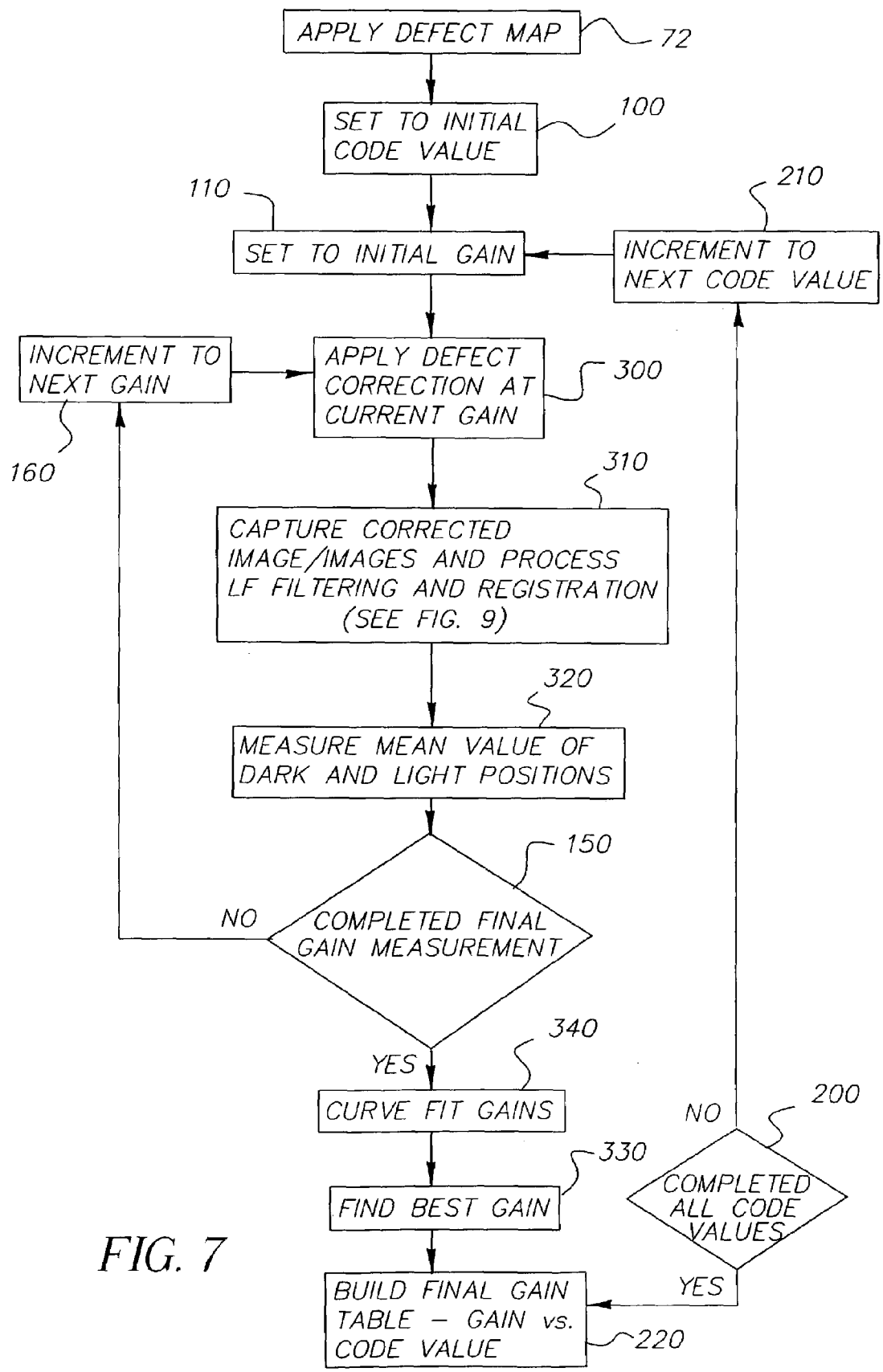
FIG. 7 is a flowchart of an automated gain table generation for low spatial frequency defects using a curve fitting algorithm.

Moving on to block 340 of FIG. 7 the mean difference value versus gain value is curve fit. Similar to the curve fit of block 230 of FIG. 5, a simple polynomial curve fit can be used, the nature of the curve fit needs to be determined prior to implementation of this method. Block 330 evaluates the curve fit for a point at which the mean difference is equal to 0. This is the point at which the darkest spot in the image has become equal to the lightest point in the image, thus the worst effect of the low frequency defect has been removed. This is recorded as the best gain for the current code value. In block 200, and 210 all remaining code values are exhausted exactly as in FIG. 5. Finally block 220 is the building of the final gain table, just as in FIG. 5, except it is the low frequency correction gain table.

Referring now to FIG. 9, is a flowchart describing the details of block 310 of FIGS. 6 and 7. Block 500, and 510 detail adjusting the camera 10 of FIG. 2, to capture fiducial images, just as for blocks 500, and 510 for FIG. 8. In block 600 is the inclusion of a block to decide if more images are needed and if so where. The spatial position of the dark and light point in the image is found in the low frequency defect map. The camera 10 is instructed through translation stages 20 of FIG. 2 to capture images at the dark and light positions of the project image 30 of also of FIG. 2. Therefore, decision block 600 instructs capture of two or more images. For simplicity, shown and described in this embodiment is just two positions, the lightest area, and darkest area of the image. In block 520 of FIG. 9 the fiducial for each image is located. Blocks 530 and 540 are the same as in FIG. 8, capturing of the corrected flat field image currently under analysis. Block 610 repeats the decision of block 600 and captures flat fields at both dark, and light area locations. Block 550 of FIG. 9, registers each image to the fiducial marks found in block 520. A low pass filter is applied 630 to limit evaluation to the defect under correction, similar to block 560 of FIG. 8.

Finally in block 620 of FIG. 9 a mean value is calculated of a portion of each dark, and light image, then the means are subtracted. This subtracted value is sent on to block 320 of FIGS. 6 and 7. It is important to note that the dark and light area positions used are the original uncorrected image dark and light area positions, as found in the defect map. As more correction gain is applied these dark and light area will switch, thus the mean difference will switch sign. This is a wanted effect as the zero crossing point is where they are equal.

Figure 11:
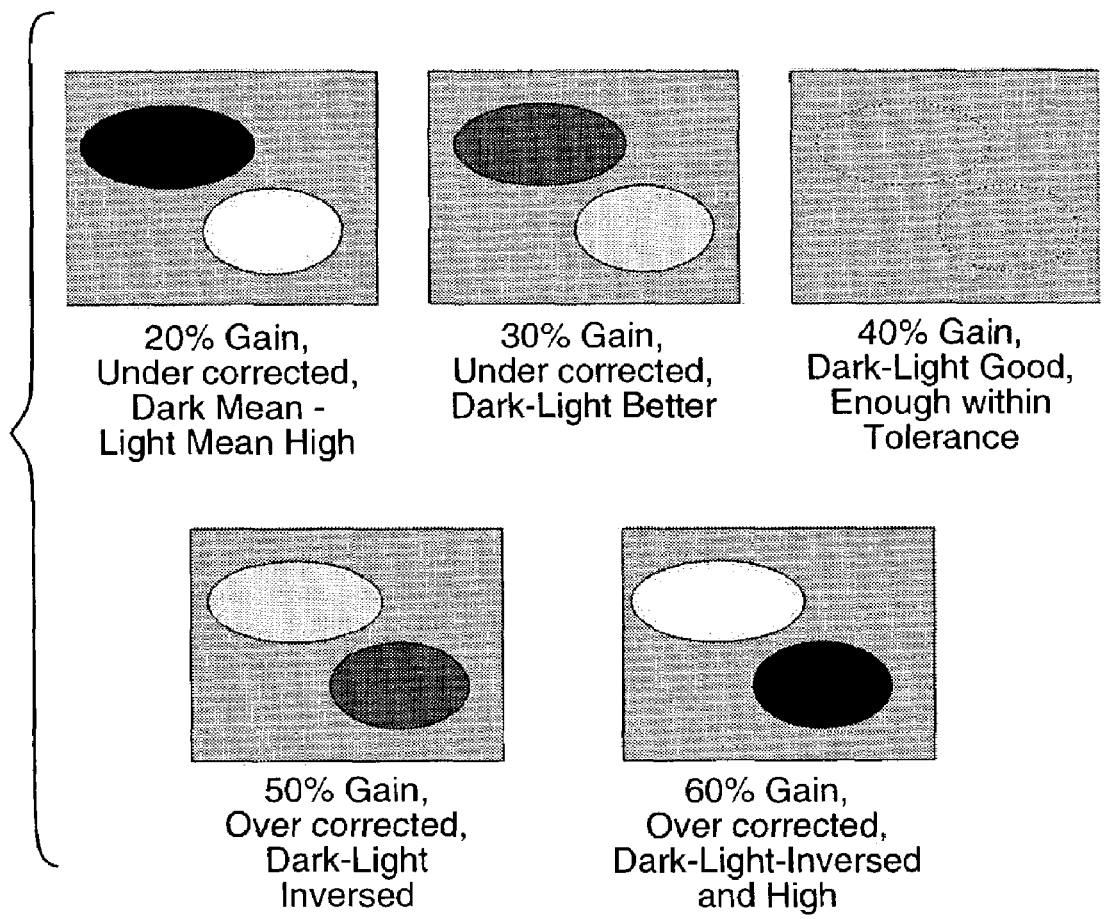
FIG. 11 shows a depiction of low spatial frequency correction images with various gain levels applied at one code value.
Figure 12:
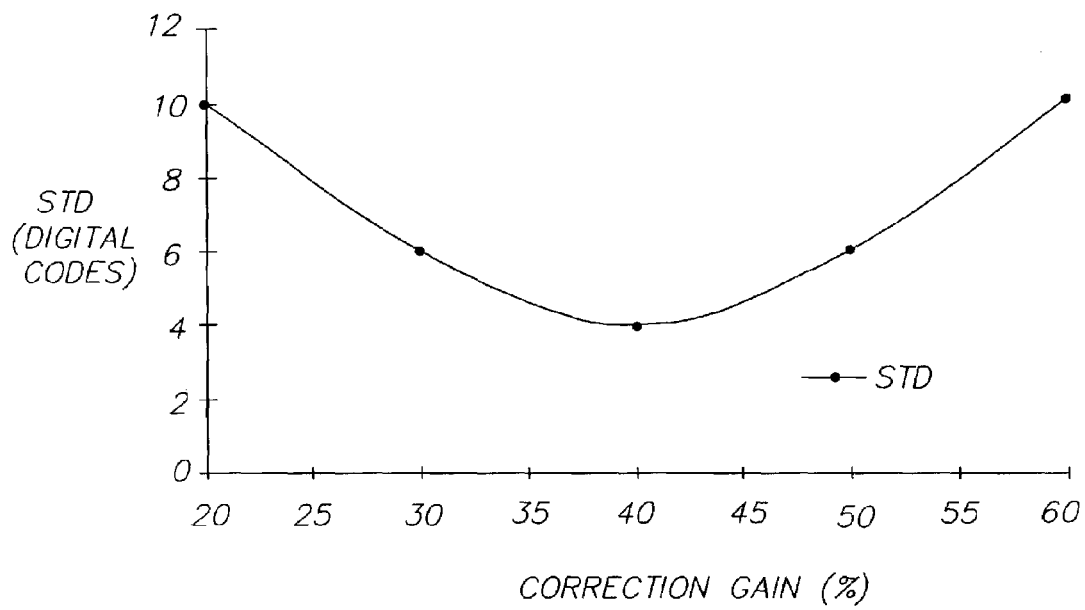
FIG. 12 is a plot showing an example of high frequency defect standard deviation versus gain for images depicted in FIG. 10.
Figure 13:
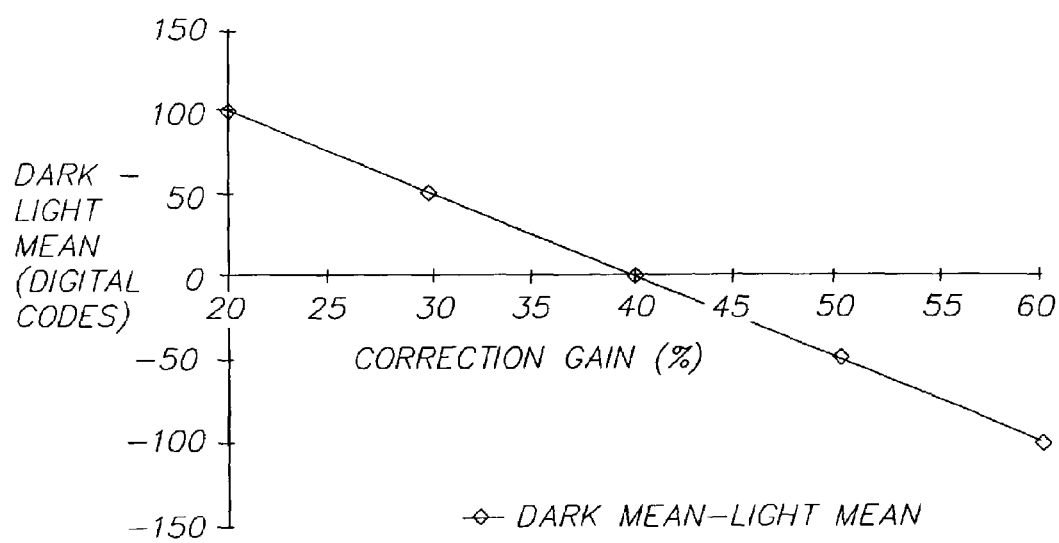
FIG. 13 is a plot showing an example of low frequency defect mean differences versus gain for images depicted in FIG. 11.

Referring next to FIG. 11 which is a set of example images after block 630 of FIG. 9. A series of images from 20% correction to 60% correction shows a defect ranging from undercorrected to perfectly corrected to over corrected images. Note the change from 20% correction to 60% correction, the dark and light area's will switch. FIG. 13 is an example plot of the mean differences of the images from FIG. 11. The means are represented by a mean value of a portion within the dark spot, and light spot. In FIG. 13 the mean difference point equal to zero shows the best gain of 40% for producing this mean difference. In the approach described in FIG. 6, many of these plots are successively repeated until the optimum gain is converged on. Whereas in FIG. 7 only one of these plots is necessary, and a single curve fit is used to obtain a minimum gain, the curve fit shown in FIG. 13 is that of a first order polynomial. This completes explanation of the determination of a gain table for low spatial frequency defects, from FIG. 6, and FIG. 7, to FIG. 9, FIG. 11, and FIG. 13.

The invention has been described in detail with particular reference to certain preferred embodiments thereof, but it will be understood that variations and modifications can be effected within the scope of the invention.

PARTS LIST

10 Camera
11 Arrow
12 Personal computer (PC)
13 Arrow
14 Camera capture system
16 LCD driver
20 Translation stages
30 Image plane
40 Projection system
50 Image data
60 Corrected image
70 Defect map
72 Apply defect map
80 Gain table
100 Set to initial code value
110 Gain table set to initial gain 120 Apply defect correction at current gain
130 Image processed
140 Measured for standard deviation
150 Completed final gain measurement
160 Increment to next gain
170 Find best gain
180 Minimum gain resolved with tolerance
190 Cut gain increment in half
192 Set start gain
200 Completed all code values
210 Increment to next code value
220 Final output of the full table
230 Curve fit gains
300 Apply defect correction at current gain
310 Capture corrected images
320 Measurement of the effect of defect

What is claimed is:

1. A method for determining an optimum gain response in a spatial frequency response correction for a projection system comprising the steps of:
   a) setting a code value to first code value;
   b) projecting a flat field image at said code value;
   c) capturing said flat field image with a camera;
   d) creating a defect map of defects in said flat field image;
   e) applying said defect map to said flat field image to form a corrected image;
   f) setting a gain table to a first gain for said corrected image;
   g) applying said gain table to said corrected image;
   h) registering said corrected image;
   i) filtering said registered image;
   j) measuring said filtered image for a standard deviation;
   k) determining whether all gains for producing an under corrected image and an over corrected image have been exhausted for said code value;
   l) if all gains have not been exhausted for said code value, set said gain table to said first gain plus n and go to step g), if all gains have been exhausted determine the optimum gain for said code value.

2. A method as in claim 1, finding the optimum gain using a curve fit method, comprising the additional steps of:
   m) determining a second-order curve fit for each of said standard deviations at each of said gains;
   n) selecting a optimum standard deviation from said second-order curve fit; and
   o) determining the optimum gain for said code value from said optimum standard deviation.

3. A method as in claim 1, finding the optimum gain using a curve fit method, comprising the additional steps of:
   m) determining a cubic spline curve fit for each of said standard deviations at each of said gains;
   n) selecting a optimum standard deviation from said cubic spline curve fit; and
   o) determining the optimum gain for said code value from said optimum standard deviation.

4. A method as in claim 2 additionally selecting gains at multiple said code values, comprising the additional steps of:
   p) if all code values have not been used to determine said gain for said code value, set said code value to said first code value plus n and go to step b), if all code values have been used to determine said gain for all said code values go to q).

5. A method as in claim 3 additionally selecting gains at multiple said code values, comprising the additional steps of:
   p) if all code values have not been used to determine said gain for said code value, set said code value to said first code value plus n and go to step b), if all code values have been used to determine said gain for all said code values go to q).

6. A method as in claim 4 to generate a gain table from said gain values for all possible said code values comprising the step of:
   q) filling a table of gain versus code value using all values of said gains from all possible said code values.

7. A method as in claim 5 to generate a gain table from said gain values for all possible said code values comprising the step of:
   q) filling a table of gain versus code value using all values of said gains from all possible said code values.

8. A method as in claim 4 to generate a gain table from said gain values for a subset of all possible code values comprising the steps of:
   q) curve fitting said gain values versus a subset of said code values; and
   r) filling a table of gain versus code value using all said curve fit gain values for all possible code values.

9. A method as in claim 5 to generate a gain table from said gain values for a subset of all possible code values comprising the steps of:
   q) curve fitting said gain values versus a subset of said code values; and
   r) filling a table of gain versus code value using all said curve fit gain values for all possible code values.

10. A method as in claim 1, finding the optimum gain using a successive approximation method, comprising the additional steps of:
   m) selecting a optimum standard deviation from said gain values
   n) determining an optimum gain from said optimum standard deviation;
   o) determining a standard deviation tolerance from gains adjacent to said optimum gain;
   p) if standard deviation tolerance is within a minimum tolerance for said optimum gain then go to r), if standard deviation is not within minimum tolerance for said optimum gain then go to q); and
   q) set new gain increment n for step 1), and reset first gain as in step f) to said optimum gain minus sum of all new n gain increments divided by 2. Go to g) for continued successive approximation approach to determine optimum gain.

11. A method as in claim 10 additionally selecting gains at multiple said code values, comprising the additional steps of:
   r) if all code values have not been used to determine said gain for said code value, set said code value to said first code value plus n and go to step b), if all code values have been used to determine said gain for all said code values go to s).

12. A method as in claim 11 to generate a gain table from said gain values for all possible said code values comprising the step of:
   s) filling a table of gain versus code value using all values of said gains from all possible said code values.

13. A method as in claim 11 to generate a gain table from said gain values for a subset of all possible said code values comprising the steps of:
   s) curve fitting said gain values versus a subset of said code values; and
   t) filling a table of gain versus code value using all said curve fit gain values for all possible code values.

14. A method for determining an optimum gain response used in a spatial frequency response correction with high spatial frequency defects for a projection system comprising the steps of:
- a) setting a code value to first code value;
- b) projecting a flat field image at said code value;
- c) capturing said flat field image with a camera;
- d) creating a defect map of defects in said flat field image;
- e) applying said defect map to said flat field image to form a corrected image;
- f) setting a gain table to a first gain for said corrected image;
- g) applying said gain table to said corrected image;
- h) registering said corrected image;
- i) filtering said registered image with a high pass filter;
- j) measuring said filtered image for a standard deviation;
- k) determining whether all gains for producing an under corrected image and an over corrected image have been exhausted for said code value;
- l) if all gains have not been exhausted for said code value, set said gain table to said first gain plus n and go to step g), if all gains have been exhausted determine the optimum gain for said code value.

15. A method as in claim 14, finding the optimum gain using a curve fit method, comprising the additional steps of:
- m) determining a second-order curve fit for each of said standard deviations at each of said gains;
- n) selecting a minimum standard deviation from said second-order curve fit; and
- o) determining the optimum gain for said code value from said minimum standard deviation.

16. A method as in claim 14, finding the optimum gain using a curve fit method, comprising the additional steps of:
- m) determining a cubic spline curve fit for each of said standard deviations at each of said gains;
- n) selecting a minimum standard deviation from said cubic spline curve fit; and
- o) determining the optimum gain for said code value from said minimum standard deviation.

17. A method as in claim 15 additionally selecting gains at multiple said code values, comprising the additional steps of:
- p) if all code values have not been used to determine said gain for said code value, set said code value to said first code value plus n and go to step b), if all code values have been used to determine said gain for all said code values go to q).

18. A method as in claim 16 additionally selecting gains at multiple said code values, comprising the additional steps of:
- p) if all code values have not been used to determine said gain for said code value, set said code value to said first code value plus n and go to step b), if all code values have been used to determine said gain for all said code values go to q).

19. A method as in claim 17 to generate a gain table from said gain values for all possible said code values comprising the step of:
- q) filling a table of gain versus code value using all values of said gains from all possible said code values.

20. A method as in claim 18 to generate a gain table from said gain values for all possible said code values comprising the step of:
- q) filling a table of gain versus code value using all values of said gains from all possible said code values.

21. A method as in claim 17 to generate a gain table from said gain values for a subset of all possible code values comprising the steps of:
- q) curve fitting said gain values versus a subset of said code values; and
- r) filling a table of gain versus code value using all said curve fit gain values for all possible code values.

22. A method as in claim 18 to generate a gain table from said gain values for a subset of all possible code values comprising the steps of:
- q) curve fitting said gain values versus a subset of said code values; and
- r) filling a table of gain versus code value using all said curve fit gain values for all possible code values.

23. A method as in claim 14, finding the optimum gain using a successive approximation method, comprising the additional steps of:
- m) selecting a minimum standard deviation from said gain values;
- n) determining an optimum gain from said minimum standard deviation;
- o) determining a standard deviation tolerance from gains adjacent to said optimum gain;
- p) if standard deviation tolerance is within a minimum tolerance for said optimum gain then go to r), if standard deviation is not within minimum tolerance for said optimum gain then go to q); and
- q) set new gain increment n for step 1), and reset first gain as in step f) to said optimum gain minus sum of all new n gain increments divided by 2. Go to g) for continued successive approximation approach to determine optimum gain.

24. A method as in claim 23 additionally selecting gains at multiple said code values, comprising the additional steps of:
- r) if all code values have not been used to determine said gain for said code value, set said code value to said first code value plus n and go to step b), if all code values have been used to determine said gain for all said code values go to s).

25. A method as in claim 24 to generate a gain table from said gain values for all possible said code values comprising the step of:
- s) filling a table of gain versus code value using all values of said gains from all possible said code values.

26. A method as in claim 24 to generate a gain table from said gain values for a subset of all possible code values comprising the steps of:
- s) curve fitting said gain values versus a subset of said code values; and
- t) filling a table of gain versus code value using all said curve fit gain values for all possible code values.

27. A method for determining an optimum gain response used in a spatial frequency response correction with low spatial frequency defects for a projection system comprising the steps of:
- a) setting a code value to first code value;
- b) projecting a flat field image at said code value;
- c) capturing said flat field image with a camera;
- d) creating a defect map of defects in said flat field image;
- e) applying said defect map to said flat field image to form a corrected image;
- f) setting a gain table to a first gain for said corrected image;
- g) applying said gain table to said corrected image;
- h) registering said corrected image;
- i) filtering said registered image with a low pass filter;

j) measuring said filtered image for a standard deviation;
k) determining whether all gains for producing an under corrected image and an over corrected image have been exhausted for said code value;
l) if all gains have not been exhausted for said code value, set said gain table to said first gain plus n and go to step g), if all gains have been exhausted determine the optimum gain for said code value.

28. A method as in claim 27, finding the optimum gain using a curve fit method, comprising the additional steps of:
   m) determining a second-order curve fit for each of said standard deviations at each of said gains;
   n) selecting a zero crossing standard deviation from said second-order curve fit; and
   o) determining the optimum gain for said code value from said zero crossing.

29. A method as in claim 27, finding the optimum gain using a curve fit method, comprising the additional steps of:
   m) determining a cubic spline curve fit for each of said standard deviations at each of said gains;
   n) selecting a zero crossing standard deviation from said cubic spline curve fit; and
   o) determining the optimum gain for said code value from said zero crossing.

30. A method as in claim 28 additionally selecting gains at multiple said code values, comprising the additional steps of:
   p) if all code values have not been used to determine said gain for said code value, set said code value to said first code value plus n and go to step b), if all code values have been used to determine said gain for all said code values go to q).

31. A method as in claim 29 additionally selecting gains at multiple said code values, comprising the additional steps of:
   p) if all code values have not been used to determine said gain for said code value, set said code value to said first code value plus n and go to step b), if all code values have been used to determine said gain for all said code values go to q).

32. A method as in claim 30 to generate a gain table from said gain values for all possible said code values comprising the step of:
   q) filling a table of gain versus code value using all values of said gains from all possible said code values.

33. A method as in claim 31 to generate a gain table from said gain values for all possible said code values comprising the step of:
   q) filling a table of gain versus code value using all values of said gains from all possible said code values.

34. A method as in claim 30 to generate a gain table from said gain values for a subset of all possible code values comprising the steps of:
   q) curve fitting said gain values versus a subset of said code values; and
   r) filling a table of gain versus code value using all said curve fit gain values for all possible code values.

35. A method as in claim 31 to generate a gain table from said gain values for a subset of all possible code values comprising the steps of:
   q) curve fitting said gain values versus a subset of said code values; and
   r) filling a table of gain versus code value using all said curve fit gain values for all possible code values.

36. A method as in claim 27, finding the optimum gain using a successive approximation method, comprising the additional steps of:
   m) selecting a nearest zero standard deviation from said gain values;
   n) determining an optimum gain from said nearest zero standard deviation;
   o) determining a standard deviation tolerance from gains adjacent to said optimum gain;
   p) if standard deviation tolerance is within a minimum tolerance for said optimum gain then go to r), if standard deviation is not within minimum tolerance for said optimum gain then go to q); and
   q) set new gain increment n for step l), and reset first gain as in step f) to said optimum gain minus sum of all new n gain increments divided by 2. Go to g) for continued successive approximation approach to determine optimum gain.

37. A method as in claim 36 additionally selecting gains at multiple said code values, comprising the additional steps of:
   r) if all code values have not been used to determine said gain for said code value, set said code value to said first code value plus n and go to step b), if all code values have been used to determine said gain for all said code values go to s).

38. A method as in claim 37 to generate a gain table from said gain values for all possible said code values comprising the step of:
   s) filling a table of gain versus code value using all values of said gains from all possible said code values.

39. A method as in claim 37 to generate a gain table from said gain values for a subset of all possible code values comprising the steps of:
   s) curve fitting said gain values versus a subset of said code values; and
   t) filling a table of gain versus code value using all said curve fit gain values for all possible code values.

40. A method as in claim 1 where said projection system is used for printing on photo sensitive print media.

41. A method as in claim 40 where photo sensitive print media is Silver Halide based.

42. A method as in claim 14 where said projection system is used for printing on photo sensitive print media.

43. A method as in claim 42 where photo sensitive print media is Silver Halide based.

44. A method as in claim 27 where said projection system is used for printing on photo sensitive print media.

45. A method as in claim 44 where photo sensitive print media is Silver Halide based.

46. A method as in claim 1 where said projection system is used for digital cinema projection.

47. A method as in claim 14 where said projection system is used for digital cinema projection.

48. A method as in claim 27 where said projection system is used for digital cinema projection.

49. A method as in claim 1 where said projection system is used for an immersive imaging display.

50. A method as in claim 14 where said projection system is used for an immersive imaging display.

51. A method as in claim 27 where said projection system is used for an immersive imaging display.

* * * * *